United States Patent
Maresh et al.

(10) Patent No.: US 7,749,941 B2
(45) Date of Patent: Jul. 6, 2010

(54) METHOD AND COMPOSITION FOR IMPROVING PERFORMANCE OF AQUEOUS AND POLYMER BASED FLUIDS AT HIGH TEMPERATURES

(75) Inventors: Jody L. Maresh, Huntsville, TX (US); William W. Shumway, Houston, TX (US); Kenneth W. Pober, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 315 days.

(21) Appl. No.: 10/746,589

(22) Filed: Dec. 24, 2003

(65) Prior Publication Data

US 2005/0148475 A1 Jul. 7, 2005

(51) Int. Cl.
*C09K 8/08* (2006.01)
*C09K 8/10* (2006.01)

(52) U.S. Cl. .................. 507/112; 507/110; 507/113; 507/114; 507/115; 507/138; 175/65

(58) Field of Classification Search .............. 507/119, 507/224
See application file for complete search history.

(56) References Cited

U.S. PATENT DOCUMENTS

| | | | | |
|---|---|---|---|---|
| 2,771,421 A | * | 11/1956 | Browning | 507/109 |
| 2,935,473 A | * | 5/1960 | King et al. | 507/109 |
| 2,939,839 A | * | 6/1960 | Brukner | 507/233 |
| 3,003,956 A | * | 10/1961 | Walker et al. | 507/260 |
| 3,046,221 A | * | 7/1962 | Dodd | 507/106 |
| 3,171,810 A | * | 3/1965 | King et al. | 507/109 |
| 3,278,425 A | * | 10/1966 | King et al. | 507/109 |
| 3,843,524 A | * | 10/1974 | Perricone et al. | 507/103 |
| 4,137,182 A | | 1/1979 | Golinkin | 252/8.55 R |
| 4,720,303 A | * | 1/1988 | Soldatos | 106/181.1 |
| 4,900,457 A | | 2/1990 | Clarke-Sturman et al. | 507/103 |
| 4,986,356 A | * | 1/1991 | Lockhart et al. | 166/300 |
| 5,143,958 A | * | 9/1992 | Lockhart et al. | 524/219 |
| 5,432,153 A | | 7/1995 | Moradi-Araghi | 507/225 |
| 5,576,271 A | * | 11/1996 | Patel | 507/110 |
| 6,103,671 A | | 8/2000 | Dobson et al. | 507/261 |

OTHER PUBLICATIONS

Abstract SU 1 467 076 A entitled "Polymeric Drilling Mud" by V.A. evetskij et al., dated Mar. 23, 1989.
Foreign communication from a related counterpart application dated Mar. 7, 2005.

* cited by examiner

*Primary Examiner*—James Seidleck
*Assistant Examiner*—John J Figueroa
(74) *Attorney, Agent, or Firm*—Craig W. Roddy; Karen B. Tripp

(57) ABSTRACT

The invention provides aqueous based well drilling and servicing fluids containing a polymer viscosifier with enhanced thermal stability provided by a diacid or diacid salt preferably having about two to about eight carbon atoms, such as, for example, sodium oxalate. The invention also provides a method of enhancing the thermal stability of aqueous based well drilling and servicing fluids containing a polymer viscosifer by adding diacid or diacid salt to the fluids.

16 Claims, 2 Drawing Sheets

METHOD AND COMPOSITION FOR IMPROVING PERFORMANCE OF AQUEOUS AND POLYMER BASED FLUIDS AT HIGH TEMPERATURES

BACKGROUND OF THE INVENTION

1. Field of the Invention

The present invention relates to aqueous based fluids having polymer viscosifiers used as wellbore treatment fluids, and to methods for using such fluids in operations such as drilling, completion, and well workover operations in subterranean formations. More particularly, this invention relates to compositions and methods for improving or extending the performance of such aqueous based, polymer containing, drilling fluids at high temperatures.

2. Description of Relevant Art

Most drilling, completion, and workover fluids used in wellbore operations in subterranean formations, particularly in the search for oil or gas, are aqueous based fluids. Such fluids commonly achieve certain desired Theological properties such as shear thinning viscosity from addition of clays such as bentonite or from addition of polymers such as polyacrylamides, celluloses, cellulose derivatives, Scleroglucan polysaccharides, and Xanthan polysaccharides. Although each type of fluid has advantages and disadvantages, aqueous based fluids with polymer viscosifiers are becoming increasingly preferred over aqueous based fluids with bentonite or other clay based viscosifiers.

In drilling operations, it is conventional for known aqueous, polymer compositions to include water soluble salts for various purposes including shale inhibition, hydrate suppression, osmotic balance between the fluid and the formation, and solids free fluid weighting agents. Such salts are typically halide salts (i.e., chlorides and bromides) of mono-or divalent cations, such as sodium, potassium, calcium and zinc. Examples of such halide salts include without limitation sodium chloride, potassium chloride, calcium bromide and zinc bromide. Formate salts have been found to enhance the thermal stability of aqueous, polymer solutions.

Extended thermal stability of drilling, completion and workover fluids is a common problem in drilling and well operations. Temperatures in subterranean formations typically rise about 1° C. per hundred feet (30 meters) depth. Various aqueous, polymer compositions have their own characteristic temperature above which they undergo severe chemical degradation with accompanying undesirable reduction of viscosity, which limits their use in drilling and well operations below a corresponding depth. A thermally stabilized fluid is typically needed for wellbore operations at temperatures above about 250° F. As the oil and gas industry continues to drill to deeper depths in and to encounter higher temperatures, there continues to be an increasing interest in and need for fluids that will be stable at such depths.

SUMMARY OF THE INVENTION

The present invention provides a method for enhancing the stability or extending the performance of aqueous fluids at high temperatures. That is, the present invention provides a method for preparing or formulating and using aqueous wellbore treatment fluids containing water soluble polymers such as celluloses, polysaccharides, and polyacrylamides at temperatures as high as 300° F. The present invention further provides such aqueous, polymer containing fluids that are stable for use at temperatures as high as 300° F. According to the invention, a thermal stabilizing agent comprising a diacid or diacid salt preferably having about two to about eight carbon atoms is added to the aqueous, polymer containing fluids.

The present invention is particularly advantageous because it achieves the high temperature performance benefits afforded by formates added to water soluble polymer containing fluids without the need for formates. In addition, diacids or diacid salts of the invention achieve the improved performance at high temperatures using lower quantities than commonly required when using formates. Further, it has been discovered that diacids or diacid salts of the invention may be substituted for formates in aqueous based drilling fluids commonly employing formates to enhance the performance and stability of those fluids, and particularly the polymers in those fluids, at high temperatures.

DETAILED DESCRIPTION OF PREFERRED EMBODIMENTS

Figure 1:
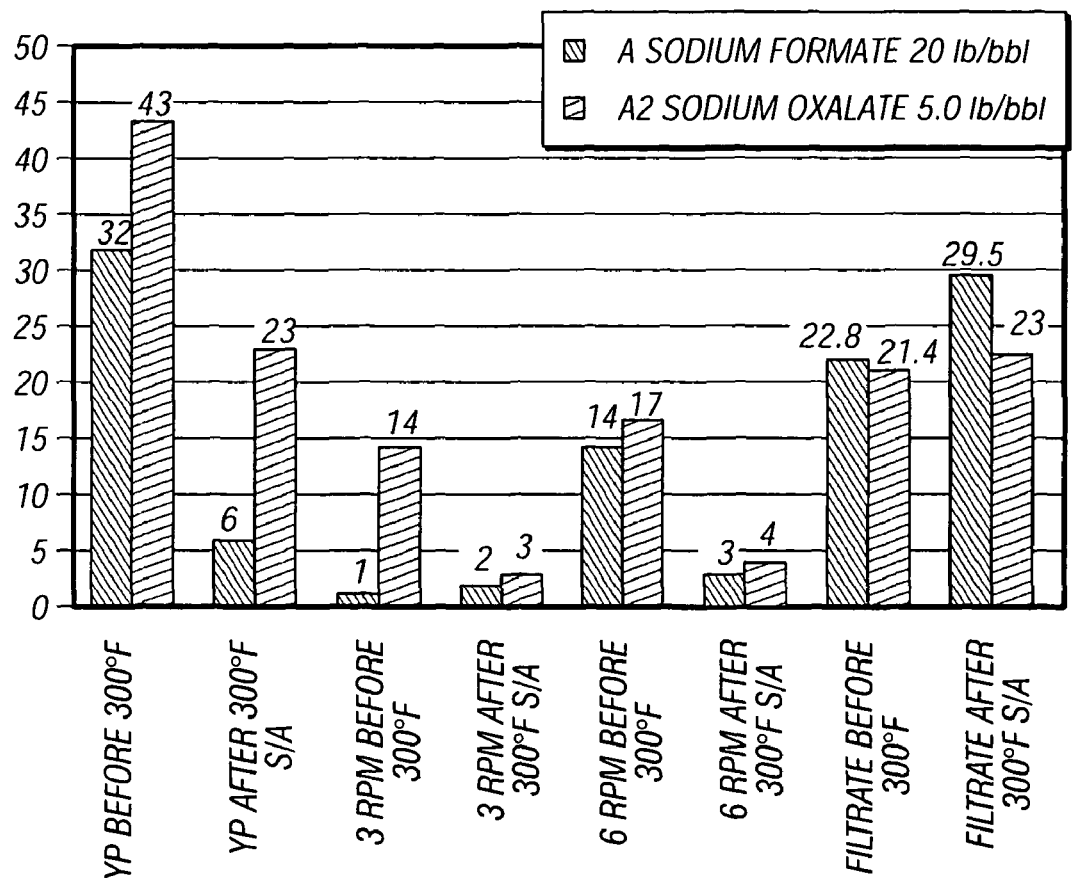
FIG. 1 is a graph comparing the high temperature performance of two samples of a commonly used formulation for an aqueous drilling fluid. Formates were added to one sample as in the prior art and oxalates were added to the other sample according to the present invention.

According to the present invention, the thermal stability of an aqueous-based fluid containing polymer can be significantly enhanced by incorporating in the fluid a diacid or diacid salt preferably having about two to about eight carbon atoms. Such diacids of the invention have the following general formula:

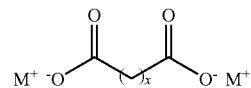

where $M^+$ is a cation and x equals a number from 0 to 6.

Preferred diacids or diacid salts of the invention have two carbon atoms and include, for example, oxalic acid or salts of oxalic acid such as sodium oxalate, lithium oxalate, potassium oxalate, calcium oxalate, and magnesium oxalate.

The advantages of this invention are not believed to be limited to a particular formulation of aqueous-based fluids, although low-solids, clay-free, polymer viscosified systems are preferred. Diacids or diacid salts of the invention are believed to improve the high temperature performance and stability of any aqueous fluid having use as a drilling fluid, completion fluid, or a well service fluid and containing polymer viscosifiers or polymer rheology control agents, whether the polymer is a synthetic polymer, such as, for example, a polyacrylamide, or a cellulose or cellulose derivative, or a biopolymer, such as, for example Xanthan or Schleroglucan polysaccharides. Examples of cellulose derivatives include without limitation carboxyethylcellulose, carboxymethylcellulose, carboxymethylhydroxyethylcellulose, alkylhydroxyalkylcellulose, alkycellulose, alkylcarboxy-alkylcellulose, hydroxyethylcellulose and other hydroxyalkylcelluloses.

Further, diacid or diacid salts of the invention may advantageously be used in "drill-in" fluids, or fluids designed for drilling through producing zones (i.e., zones of a subterranean formation bearing hydrocarbons), as well as in fluids designed for general drilling of boreholes in subterranean formations, particularly through non-producing zones. That is, preferred diacids and diacid salts of the invention, such as, for example, oxalic acid and oxalate, and especially sodium oxalate, do not leave a residue that is difficult to remove or that otherwise damages the zone or interferes with later production of hydrocarbons from the zone.

Additionally, diacids or diacid salts of the invention may be substituted for formate taught in U.S. Pat. No. 4,900,457 of Clarke-Sturman et al. to improve thermal stability of aqueous polysaccharide solutions, although lesser quantities of diacid salts will be needed than typically required when using formate. Generally, an amount of diacid salt ranging from about 5 lb/bbl to about 10 lb/bbl will impart enhanced thermal stability to an aqueous based fluid containing polymer. A minimum amount of diacid salt—about 5.0 lb/bbl—is preferred.

The enhanced thermal stability generally afforded to aqueous fluids by the present invention allows use of the fluids at temperatures as high as about 300° F. or higher, particularly when the thermal stability of the polymer in the fluid is the limiting factor for use of the fluids at such high temperatures.

Incidental quantities of other salts such as sulphates, nitrates and bicarbonates may be present in any fluid used in a subterranean borehole and inevitably will be present in fluids where sea water, or other naturally occurring brine is used in formulating the fluid. Such other salts are not believed to interfere with the thermal stability enhancing qualities imparted by diacids or diacid salts of the invention to the fluid. However, preferably the pH of the fluid is maintained at about 7.0 or above so as to keep the diacid of the invention in salt form, at least when the fluid is being used. A preferred pH for fluids containing diacid salt according to the present invention is at least about 9.0.

The present invention provides a process of preparing an aqueous based, polymer containing, composition of the invention. Such process comprises dissolving at least about 5.0 lb/bbl of diacid or diacid salt in an aqueous composition containing water-soluble polymer. Those skilled in the art will appreciate that the order of incorporation of components in the composition is primarily a matter of convenience.

Further, the present invention provides use of a composition of the invention as a drilling fluid, a completion fluid, or a work-over fluid or other well service fluid in a well-drilling operation. The composition of the invention is generally any aqueous based drilling, completion or well service fluid comprising polymer viscosifiers or rheology control agents. Preferred compositions of the invention are low-solids, clay-free, polymer-viscosified aqueous based systems.

The advantages of the invention are demonstrated by the following Examples.

EXPERIMENTS

Example I

A drilling fluid was prepared with a typical commercial formulation for drilling a borehole in a subterranean formation. The fluid had an aqueous base—fresh water, salt water, and sodium chloride, and sodium hydroxide for controlling pH, commercially available polymers—BARAZAN D PLUS™ polymer (Xanthan polymer), CLAY SYNC™ polymer (low molecular weighted polyacrylamide polymer), CLAY GRABBER™ polymer (40% active high molecular weighted polyacrylamide in a low viscosity emulsion), all available from Halliburton Energy Services, Inc. in Houston, Tex., U.S.A., filtration control agents—FILTERCHEK™ additive, N-DRIL HT PLUS™ additive, or PAC-L™ additive, all available from Halliburton Energy Services, Inc. in Houston, Tex., U.S.A., a shale stabilizing additive—CLAY-SEAL™ additive (an ethoxylated amine in methanol), available from Halliburton Energy Services, Inc. in Houston, Tex., U.S.A., and Barite (barium sulfate) weighting material. The fluid components had a concentration in the aqueous base of 10.5 lb/gal, typical for a commercial drilling fluid. To one sample of this fluid, 20.0 lb/bbl sodium formate was added (as in the prior art) and to another sample of this fluid (without formate), 5.0 lb/bbl sodium oxalate was added (according to the present invention). The yield point of the two samples was compared before and after exposure to 300° F. temperatures. The filtrate before and after exposure to 300° F. temperatures was also measured. FIG. 1 shows the results and indicates that a lesser amount of sodium oxalate than formate imparted greater thermal stability to the fluid than formate, indicating a cost benefit of the present invention as well as its effectiveness.

Example II

Figure 2:
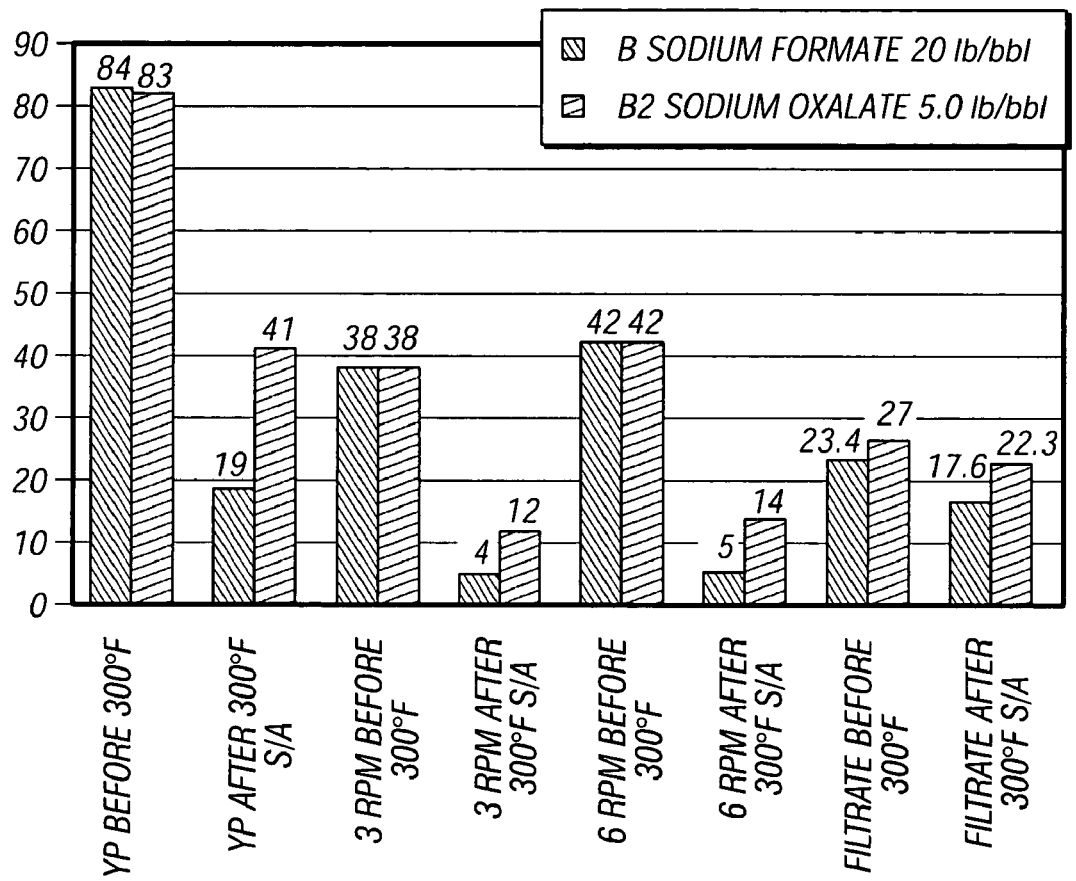
FIG. 2 is a graph comparing the high temperature performance of two samples of another commonly used formulation for an aqueous drilling fluid. Formates were added to one sample as in the prior art and oxaltes were added to the other sample according to the present invention.

The experiment of Example I was repeated for a different fluid formulation. For this second example, a drilling fluid was prepared with a typical commercial formulation for drilling a borehole through a payzone or hydrocarbon bearing portion of a subterranean formation. The fluid had an aqueous base—fresh water, salt water, and sodium chloride, and BARABUF™ additive (magnesium oxide) available from Halliburton Energy Services, Inc. in Houston, Tex., U.S.A. for controlling pH, commercially available polymers—BARAZAN D PLUS™ polymer (Xanthan polymer), N-DRIL HT PLUS™ additive (cross-linked waxy maize starch), and BARACARB™ 600, 150, 50 and/or 25 additive (calcium carbonate), all available from Halliburton Energy Services, Inc. in Houston, Tex., U.S.A. The fluid components had a concentration in the aqueous base of 10.5 lb/gal, typical for a commercial drilling fluid. As in Example I, to one sample of this fluid, 20.0 lb/bbl sodium formate was added and to another sample of this fluid (without formate), 5.0 lb/bbl sodium oxalate was added. The yield point of the two samples was compared before and after exposure to 300° F. temperatures. The filtrate before and after exposure to 300° F. temperatures was also measured. FIG. 2 shows the results and indicates, as in Example I and FIG. 1, that a lesser amount of sodium oxalate than formate imparted greater thermal stability to the fluid than formate, again indicating a cost benefit of the present invention as well as its effectiveness.

The foregoing description of the invention is intended to be a description of preferred embodiments. Various changes in the details of the described methods and compositions can be made without departing from the intended scope of this invention as defined by the appended claims.

What is claimed is:

1. A method for drilling a borehole in a subterranean formation having temperatures greater than 250° F., said method comprising drilling a borehole in the subterranean formation; employing an aqueous based, clay-free, drilling fluid in said drilling operation, said fluid comprising a water soluble polymer viscosifier or rheology control agent; and enhancing the tolerance of said fluid to said temperatures by adding to or including in said fluid a diacid or diacid salt in the range of about 5 lb/bbl to less than 10 lb/bbl, at a pH of greater than 7, wherein said diacid or diacid salt has about two to about eight carbon atoms, said diacid has a formula:

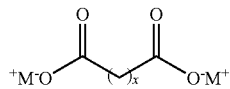

where $M^+$ is a cation and x equals a number from 0 to 6; wherein all diacid salt in said fluid is selected from the group of oxalate salts consisting of sodium oxalate, lithium oxalate, potassium oxalate, and calcium oxalate; wherein said water soluble polymer is a viscosifier selected from the group of polymers consisting of celluloses, cellulose derivatives, Scleroglucan polysaccharides, and Xanthan polysaccharides and other biopolymers.

2. The method of claim 1 wherein said diacid or diacid salt has about two to about eight carbon atoms.

3. The method of claim 1 wherein said drilling of a borehole is through a producing zone and said drilling fluid does not leave a difficult to remove residue that interferes with production from the zone.

4. The method of claim 1 wherein said drilling includes completion of the borehole.

5. The method of claim 1 wherein said cellulose derivatives are selected from the group consisting of carboxyethylcellulose, carboxymethylcellulose, carboxymethylhydroxyethylcellulose, alkylhydroxyalkylcellulose, alkycellulose, alkylcarboxy-alkylcellulose, hydroxyethylcellulose and other hydroxyalkylcelluloses.

6. The method of claim 1 wherein the amount of said diacid or diacid salt in said fluid is about 5 lbs/bbl.

7. The method of claim 1 wherein said fluid is stable at temperatures as high as about 300° F.

8. The method of claim 7 wherein said stability is achieved without formate salts.

9. The method of claim 1 wherein said diacid salt is sodium oxalate.

10. The method of claim 1 wherein the drilling fluid is a low-solids, clay-free, polymer viscosified system.

11. The method of claim 10 wherein the pH of said fluid is at least about 9.

12. A method for increasing the stability of an aqueous based drilling fluid comprising a water-soluble polymer selected from the group of polymers consisting of celluloses, cellulose derivatives, Scleroglucan polysaccharides, and Xanthan polysaccharides, during use in drilling at temperatures ranging from greater than 250° F. to 300° F. without adding clay or formate salts, said method consisting of adding diacid or diacid salt in the range of about 5 lb/bbl to less than 10 lb/bbl to said fluid at a pH greater than 7 while drilling with said fluid, wherein said diacid or diacid salt has about two to about eight carbon atoms, said diacid has a formula:

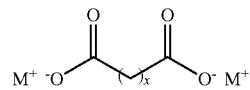

where $M^+$ is a cation and x equals a number from 0 to 6, and said diacid salt is selected from the group of oxalate salts consisting of sodium oxalate, lithium oxalate, potassium oxalate, and calcium oxalate.

13. The method of claim 12 wherein the amount of said diacid is about 5 lb/bbl of said fluid.

14. A process for preparing an aqueous-based, low-solids, clay-free, polymer viscosified drilling fluid system comprising a water-soluble polymer selected from the group consisting of polyacrylamides, celluloses, cellulose derivatives, Scleroglucan biopolymers, Xanthan biopolymers, and other biopolymers; and at least about 5 lb/bbl and less than 10 lb/bbl of oxalate or oxalic acid to provide thermal stability without clay or formate salts at temperatures as high as about 300° F. at a pH of at least about 9, wherein said oxalate is selected from the group of oxalate salts consisting of sodium oxalate, lithium oxalate, potassium oxalate, and calcium oxalate; said method comprising dissolving at least about 5 lb/bbl of oxalate salt or oxalic acid in the aqueous fluid containing the water-soluble polymer.

15. The method of claim 1 wherein the subterranean formation temperature is 300° F.

16. The method of claim 12 wherein the fluid is stable at a temperature of 300° F.

* * * * *